United States Patent [19]

Lowery

[11] Patent Number: 4,869,919
[45] Date of Patent: Sep. 26, 1989

[54] MELTABLE SPREAD COMPOSITION

[75] Inventor: Arthur N. Lowery, Sandy, Oreg.

[73] Assignee: Gregg Foods of Portland, Inc., Portland, Oreg.

[21] Appl. No.: 198,953

[22] Filed: May 26, 1988

[51] Int. Cl.⁴ .............................................. A23D 3/00
[52] U.S. Cl. .................................. 426/604; 426/603; 426/658; 426/804
[58] Field of Search ................. 426/603, 658, 804, 604

[56] References Cited

U.S. PATENT DOCUMENTS

| | | | |
|---|---|---|---|
| 4,226,895 | 10/1980 | Miller et al. | 426/658 |
| 4,238,520 | 12/1980 | Miller et al. | 426/573 |
| 4,414,229 | 11/1983 | Bakal et al. | 426/98 |
| 4,536,408 | 8/1985 | Morehouse et al. | 426/250 |
| 4,615,892 | 10/1986 | Morehouse et al. | 426/250 |

FOREIGN PATENT DOCUMENTS 0256712  7/1987  European Pat. Off. .

*Primary Examiner*—Donald E. Czaja
*Assistant Examiner*—Celine T. Callahan
*Attorney, Agent, or Firm*—Steve Rosenblatt; W. D. Hunter

[57] ABSTRACT

A nongelling meltable spread composition useful as a reduced calorie margarine which includes edible fat at levels of from about 44 to 55 percent and a low D.E. maltodextrin at levels of about 2 to 8 percent.

11 Claims, No Drawings

MELTABLE SPREAD COMPOSITION

FIELD OF THE INVENTION

This invention relates to spreads useful as margarine or butter substitutes having reduced calorie content.

BACKGROUND OF THE INVENTION

Spreadable emulsions which are used as substitutes for butter have generally become classified according to their oil content. Margarine contains not less than 80 percent fat as set forth in the standard of identity of the Federal Food, Drug and Cosmetic Act, 21 CFR 166.110. The margarine is produced by admixing of two phases, oil and aqueous. The oil blending may be done by the refiner or the margarine manufacturer and color may be added, generally carotene to the oil, as well as vitamins and emulsifiers. About 16-18 percent skim milk or water, plus flavorants, salt and preservatives are added to the liquid phase. Diet margarine must have one-third less calories than conventional margarine, and whereas whey or milk powder may be used in margarine because these the same cannot be used in diet margarine because these ingredients have the effect of breaking the emulsion. The diet margarines contain about 60 percent of water and between about 30–35 percent of oil.

The so-called "spreads" are between margarine and diet margarine in oil content and thus contain between about 40 and 80 percent of oil.

The diet margarines, and the "spreads" which are generally sold in plastic tubs, while having less calories than margarine, are less desirable than margarine from the standpoint of taste and mouthfeel.

The reduction in caloric content is generally achieved in these prior art products by increasing the water content and lowering the fat content of the products to the range of about 40 to 60 percent. In order to obtain such fat contents, the addition of various emulsifiers and/or other ingredients to maintain a stable, plastic emulsion of the water-in-oil type is generally required. Further reduction in fat content and caloric content, while desired, has been most difficult to achieve because of problems in maintaining the oil as the continuous phase which is required so that the product exhibits natural texture and mouthfeel. Moreover, the combination of fats and emulsifiers and/or other ingredients such as hydrocolloids employed in a number of prior art low calorie spreads impart a waxy mouthfeel and provide melting characteristics bearing little resemblance to conventional margarines or natural butter.

U.S. Pat. No. 4,536,408, issued on Aug. 20, 1985 to Morehouse, et al., describes a low fat spread using a non-gelled starch hydrolyzate having a D.E. (dextrose equivalent) of about 4 and not more than 25. This spread contained 15 to 35 percent starch hydrolyzate and 15 to 35 percent edible fat.

U.S Pat. No. 4,226,895, issued on Oct. 7, 1980 to Miller, et al., describes a non-pourable, flavored, spreadable emulsion comprising 8 to 15 percent vegetable fat, water and sweetening agent, in the proportion of about 3–4:1 sweetening agent to water in addition to a stabilizer. Maltodextrin was suggested as a sweetening agent component.

In U.S. Pat. No. 4,414,229, issued Nov. 8, 1983 to Bakal, et al., maltodextrins were found to be suitable carriers for flavors to be used in margarine.

In U.S. Pat. No. 4,238,520, issued Dec. 9, 1980 to Miller, et al., a fat spread was prepared by using thickening agents such as cellulose ethers, gums, starch and starch derivatives, algin, etc. This spread contained 20 to 40 percent fat.

SUMMARY OF THE INVENTION

The present invention, which is a water-in-oil emulsion, comprises:
(a) from about 44 to about 55 percent edible fat;
(b) from about 2 to about 8 percent maltodextrin having a Dextrose Equivalent of greater than about 4 and less than about 20;
(c) water; and
(d) a minor amount of an emulsifier; and wherein the said composition melts when heated or spread on warm foods.

DETAILED DESCRIPTION OF THE INVENTION

The invention relates to a low fat spread composition that can be used for a low or reduced calorie substitute for margarine or butter. The composition is non-gelling and thus melts when heated or applied to a warm food such as toast.

In this invention, maltodextrin or low dextrose equivalent (D.E.) starch hydrolyzates are used to replace a portion of the oil in the water-in-oil emulsion composition. Replacement of 9 calorie per gram oil with 4 calorie per gram maltodextrin and water is an effective means of reducing the calorie content of the spread. The oil content is reduced to meet legal requirements for reduced calorie foods.

The present invention relates to the discovery that the use of a minor amount of maltodextrin, preferably from about 3 to about 7 percent, more preferably about 4 to about 6 percent, in an emulsion of fat and water provides the desired textural, spread and meltability characteristics for an acceptable reduced calorie spread. The preferred maltodextrin should have a D.E. of less than 20, preferably less than 15 and most preferably less than 10 and greater than about 4. The lower D.E. maltodextrins provide the desired textural and melt properties without making the spread too sweet.

The low fat spread is comprised of from about 44 to about 55 percent, preferably from about 47 to about 53 percent oil or fat.

The fat employed to form a spread in accordance with the invention is an edible animal or vegetable fat which is normally congealed (solid) at room temperature (70°–72° F.) and having a melting point above about 38° C. (100° F.). Fats having melting points substantially below 32° C. (90° F.) generally are not satisfactory in that they do not undergo phase inversion readily and do not provide a product with the desired butter-like consistency at ambient temperatures. However, some fats melting below about 22° C. do give satisfactory results when blended with a higher melting fat. Fat compositions obtained by blending low melting fats with high melting fats may exhibit improved texture and cold spreadability over that provided by the individual fats. Fat and oil compositions can be blended to provide the desired Solid Fat Index (SFI) profile. In general, a composition with an SFI of less than 28 will have the desired spreadability. Soft margarines have an SFI of from 22 to 24 at 10° C. Examples of useful suitable fats to employ are partially hydrogenated vegetable oils such as soybean, cottonseed or palm oil or mixtures thereof which are available commercially under such names as Crisco (Procter & Gamble); Diamond D-20, Paramount X and Hydrol 100 (Durkee Foods, Inc.); Margarine Oil 8152 (Anderson-Clayton Co.), butterfat, lard, combinations of vegetable and animal fats and the like.

The spread composition also comprises water, preferably from about percent.

In accordance with another embodiment of the invention, the method of making the spread is disclosed. The process for making the composition includes:

(1) Preparing an emulsifier pre-blend composition

The emulsifier pre-blend includes lecithin, monoglycerides, and other appropriate emulsifiers, either alone or in combination. The emulsifiers are blended with a portion of the oil to be used in the spread. Other fat soluble components, including vitamins (vitamin $A_1$, coloring agents (beta carotene) and butter flavors are included in the emulsifier pre-blend. The emulsifier pre-blend composition is prepared by combining the ingredients and heating, generally to about 100° F. to about 120° F. with agitation to melt all components.

(2) Preparing a water phase pre-blend composition

The water phase pre-blend composition contains the water and water soluble ingredients of the spread composition. Water soluble ingredients include salt, preservatives, including benzoate and sorbate, pH agents, including food acids such as citric acid, and the maltodextrin component.

(3) Preparing pre-emulsion blend

The oil or fat component, which preferably contains a high melting component and a low melting point component, is combined in the desired ratios with the emulsifier pre-blend composition and the water phase pre-blend composition to yield a pre-emulsion blend. The temperature pre-emulsion blend is adjusted to the appropriate temperature for feeding the internal chilling machine such as a swept surface heat exchanger. The preferred temperature for the composition is about 98° F. to about 104° F.

(4) Spread (emulsion) formation

The pre-emulsion blend is fed through ammonia gasketed, swept surface heat exchangers to form the emulsified spread composition. The product exits the heat exchanger at about 50°-70° F. and is filled into containers.

The following examples further illustrate the invention:

EXAMPLE 1

LIGHT SPREAD

| Overall Formula: | % |
|---|---|
| Soybean Oil 70-74 IV (120° F.)(1) | 14.800 |
| Soybean Salad Oil (65° F.) | 32.500 |
| Emulsifier Pre-Blend | 0.832 |
| Water Phase Pre-Blend | 51.868 |
| | 100.000 |
| (1) SFI Profile @ 10° C. | 49-52 |
| SFI Profile @ 21° C. | 35-38 |
| SFI Profile @ 33° C. | 11-13 |

| SFI Profile @ 40° C. | 4 max. |
|---|---|
| Emulsifier Pre-Blend Composition: | % |
| Soybean Lecithin | 16.034 |
| Distilled 90% Monoglycerides | 24.163 |
| Soybean Salad Oil | 56.453 |
| Vitamin A/Beta Carotene | 0.481 |
| 22% H.S. Beta Carotene | 0.121 |
| Butter Flavor | 2.748 |
| | 100.000 |
| Water Phase Pre-Blend Composition: | % |
| Water | 86.581 |
| Salt | 3.568 |
| Benzoate | 0.107 |
| Sorbate | 0.107 |
| Citric Acid | 0.004 |
| Maltodextrin 4 D.E. (5% of total Spread Composition) | 9.633 |
| | 100.000 |

Process Description

The emulsifier pre-blend ingredients were combined and heated to 120° F. ±10° F. The water phase ingredients were combined with sufficient agitation to insure solution of all components, and heated to 100° F. 10° F.

Each of the four components were combined according to the formula percentages using a metered proportioning pump (Bran & Lubbe), equipped with four metering heads. The resulting pre-emulsion was fed into a 100 gallon mixing tank equipped with a 2.5 h.p. electric agitation and a 3.0 h.p. centrifugal recirculation pump, utilizing a 1-½" recirculation pipe. Pre-emulsion temperature was 98° F. to 104° F.

The pre-emulsion was fed through 2 ammonia jacketed, swept surface heat exchangers (6'×72" votator "A" units) and 2 pinning units (votator "B" units), at a feed rate of 9,600 lbs./hr. Pressure was applied with an "extrusion" valve downstream from the "B" unit at 300 PSI. Outlet temperature was 58° F. Samples for evaluation were run in 1 pound plastic tubs on standard soft margarine filling equipment.

EXAMPLE 2

EVALUATION OF COMPOSITION OF THE INVENTION

The spread of Example I and two commercial "light" spreads were compared by sensory evaluation.

Sixteen panelists were chosen at random to participate in the sensory evaluation.

The three products were presented on plain white plates to the panelists. The panelists were asked to toast bread, and spread each of the test products on the toast.

Participants were asked to evaluate the three products and record their observation concerning the melting characteristic, flavor, texture and overall preference. The evaluation form was constructed with a "Hedonic Ruler" scaled from 1 to 10, with descriptors ranging from dislike extremely to like extremely. The participants were asked to utilize the ruler in scoring each coded sample, for each of the indicated chracteristics. The order of sample presentation was altered once during the panel.

Results from the sensory evaluation were as follows:

| Charac-teristics | Composition of Example I | Leading National Light Spread | Light Counterpart of Example I Without Maltodextrin |
|---|---|---|---|
| | Score | | |
| Melting | 7.0 | 4.5 | 4.1 |
| Overall | 7.3 | 4.4 | 5.3 |

The specific compositions of this invention using a relatively low level of maltodextrin yielded a spread that had an enhanced appearance on hot foods. Prior art compositions using high levels of gelled maltodextrin do not melt on the surface of hot foods. The addition of the low level of maltodextrin allows the emulsion to freely break apart under heat and more closely mimics margarine and butter, thus overcoming one of the consumers' main objections to reduced calorie spreads.

EXAMPLE 3

Other spreads were prepared using the general process of Example 1 with formula adjustments to provide 0, 10 and 20 percent maltodextrin in the final spread formulations. None of these products exhibited the desired melting or overall sensory properties.

What is claimed is:
1. A non-gelled low fat spread composition, said composition being a water-in-oil emulsion comprising:
   (a) from about 44 to about 55 percent edible fat;
   (b) from about 2 to about 8 percent maltodextrin having a Dextrose Equivalent of greater than about 4 and les than about 20;
   (c) water; and
   (d) a minor amount of an emulsifier, and wherein said composition melts when heated or spread on warm foods.
2. The low fat spread composition of claim 1 wherein said maltodextrin is characterized by having a Dextrose Equivlent of greater than about 4 and less than about 10.
3. The low fat spread composition of claim 1 wherein said edible fat comprises from about 47 to about 53 percent of said spread composition.
4. The low fat spread composition of claim 1 wherein said maltodextrin comprises from about 4 to about 6 percent of said spread composition.
5. The composition of claim 1 wherein the said edible fat is soybean oil and soybean salad oil.
6. The composition of claim 1 wherein the said emulsifier is lecithin and monoglycerides.
7. The composition of claim 1 wherein the said emulsifier is soybean lecithin and distilled 90 percent monoglycerides.
8. The composition of claim 1 wherein the said composition contains about 40 to about 48 percent water.
9. The composition of claim 1 wherein the said composition also includes a coloring agent.
10. The composition of claim 1 wherein the said composition also includes a flavoring agent.
11. The composition of claim 1 wherein the said edible fat is soybean oil and soybean salad oil, wherein the said maltodextrin has a Dextrose Equivalent of 4, wherein the said emulsifier is soybean lecithin and distilled 90 percent monoglycerides, and wherein the said composition also includes beta carotene as a coloring agent and butter flavors as a flavoring agent.

* * * * *